Figure 1:
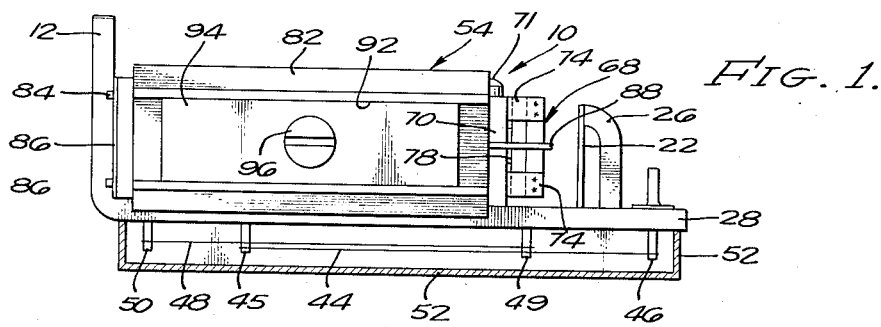

Dec. 20, 1960          G. J. BROWN          2,965,866

UNBONDED STRAIN GAGE COUNTERBALANCED TRANSDUCER

Filed Oct. 6, 1959          2 Sheets-Sheet 1

INVENTOR.
GEORGE J. BROWN
BY Philip Sutkow
Max Gilden
ATTORNEYS

Dec. 20, 1960    G. J. BROWN    2,965,866
UNBONDED STRAIN GAGE COUNTERBALANCED TRANSDUCER
Filed Oct. 6, 1959    2 Sheets-Sheet 2
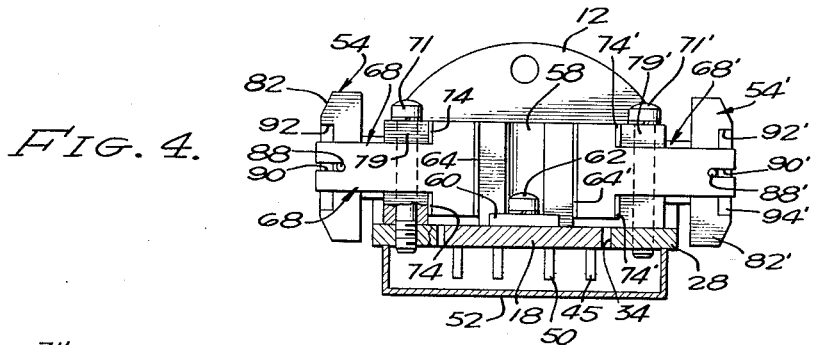
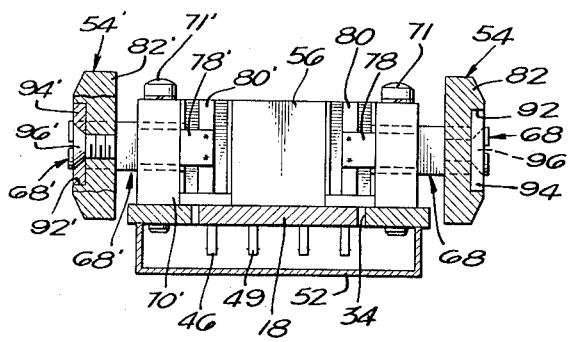
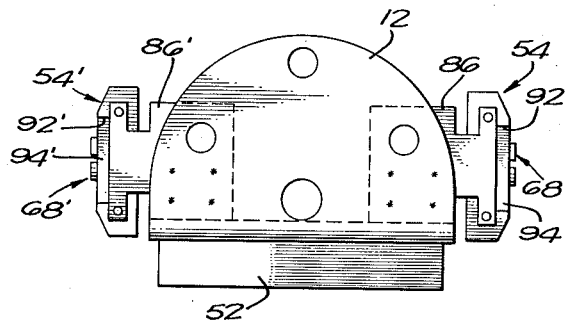
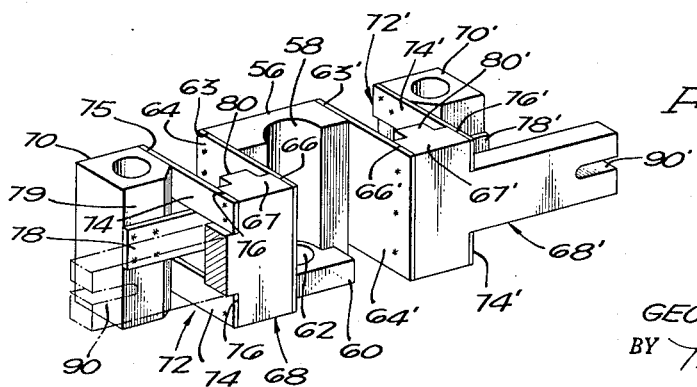
INVENTOR.
GEORGE J. BROWN
BY
ATTORNEYS United States Patent Office 2,965,866
Patented Dec. 20, 1960

2,965,866

UNBONDED STRAIN GAGE COUNTERBALANCED TRANSDUCER

George J. Brown, Riverside, Calif., assignor to Statham Instruments, Inc., Los Angeles, Calif., a corporation of California Filed Oct. 6, 1959, Ser. No. 844,778

10 Claims. (Cl. 338—5)

This invention relates to motion sensing devices for measurement of force or displacement, and is particularly concerned with transducers, especially of the unbonded strain gage type, which are counterbalanced to avoid spurious responses.

Transducers for measuring pressure or force are well known in the art. In one general type an armature is mounted in a frame so that the armature is movable with respect to the frame. A force summing member is connected to the armature to cause displacement thereof in response to an applied force, and a motion sensing means such as an unbonded strain gage is connected to the armature to sense the displacement thereof.

Particularly in certain applications, where the instrument is set on end, or is subjected to an acceleration, the armature may be displaced due to its weight, in the absence of or independent of a displacement produced by the force summing member in the normal operation of the device, causing a spurious response and output by the motion sensing means. This problem is especially troublesome where the force or pressure to be sensed is relatively small, in which case the displacement of the armatuer due to its weight can constitute a substantial percentage of the displacement caused by the pressure or force to be measured. This may occur, for example, where transducers of this type are used to measure pressures less than about 25 p.s.i.

It is an object of this invention to design a transducer which overcomes the problem of extraneous motion of the armature which is not produced by a force or pressure being measured.

Another object is the provision of a transducer, particularly of the unbonded strain gage type, whose armature is counterbalanced against spurious motion of the armature not produced by the force or pressure being measured.

The above and other objects and advantages are achieved according to the invention by designing a transducer whose armature is counterbalanced on opposite sides thereof by symmetrical counterbalancing mechanisms comprising substantially equal masses each having a lever connection to the armature. The two lever systems are substantially alike and arranged symmetrically on opposite sides of the armature so that when the armature is displaced, e.g., by its own weight, the counterbalancing weights are also displaced in equal amounts in the same direction as the armature. The arrangement of the lever arms results in equal and opposite moments of force applied to the armature by the two lever systems about their respective hinge points, producing a net force which opposes and restrains the spurious displacement of the armature.

In normal operation of the instrument, when a force to be measured is applied by the force summing member to the armature to produce a corresponding displacement thereof, the instrument is designed and calibrated so that the opposing force against the armature produced by the counterbalancing system is taken into account. In other words, in normal operation the instrument will function in its usual manner, but the displacement of the armature will not be as great for a given applied force, due to the restraint imposed by the armature counterbalancing system, than it would otherwise be in the absence of the counterbalancing system.

Figure 2:
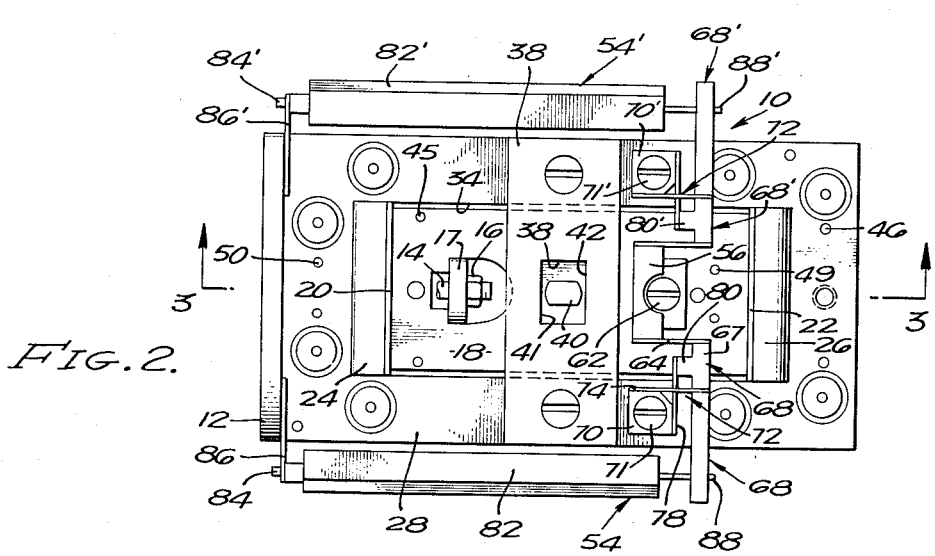
Figure 3:
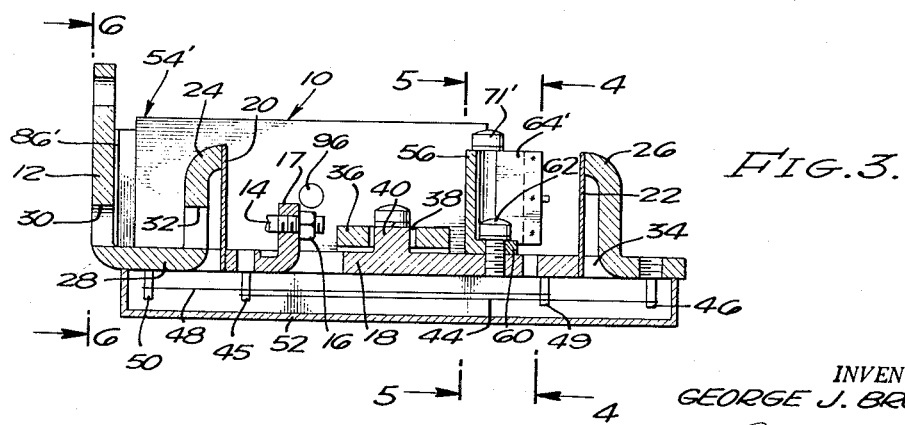

The invention will be more clearly understood from the description below of a preferred embodiment, taken in connection with the accompanying drawings wherein:

Fig. 1 is a side elevation of the instrument;
Fig. 2 is a plan view of the device of Fig. 1;
Fig. 3 is a longitudinal section taken on line 3—3 of Fig. 2;
Fig. 4 is a section taken on line 4—4 of Fig. 3;
Fig. 5 is a section taken on line 5—5 of Fig. 3;
Fig. 6 is an end view taken on line 6—6 of Fig. 3; and
Fig. 7 is a perspective view of the counterbalancing lever system of the device.

Referring to Figs. 1 to 3 of the drawings, numeral 10 represents a transducer which is supported on a bracket 12 suitably connected to a base member (not shown). The transducer comprises a rod, a portion of which is shown at 14, one end of the rod being attached by a connection indicated at 16 to a member 17 mounted on an armature 18. The armature is supported on flat leaf springs 20 and 22 which are in turn mounted on ears 24 and 26. Ears 24 and 26 are mounted on a frame 28 of the transducer. A bore 30 is provided in the bracket 12, a bore 32 is provided in the ear 24, and a third bore (not shown) is formed in the leaf spring 20, through which the rod 14 passes for external connection to a force applying means (not shown).

The frame 28 is formed with a rectangular hole 34 adjacent the armature (see Fig. 2). The armature is positioned within the hole 34 for movement of the armature on leaf springs 20 and 22 in response to the motion of rod 14. A stop overload bar 36 is connected to frame 28 and extends across the hole 34. Bar 36 has a central aperture 38 which receives a stop member 40 connected to armature 18. Stop 40 limits the motion of the armature by contact with either of the opposite edges 41 or 42 of the aperture 38.

Beneath the armature 18 and frame 28 are provided a series of pins on which are mounted strain wires. Stretched in tension between a pin 45 connected to the armature and a pin 46 on the frame is a strain wire 44, and stretched in tension between a pin 49 on the armature and a pin 50 on the frame is a strain wire 48. The general structure of the transducer described above is described in Patent No. 2,573,286 and the pins and strain wires are mounted in a manner such as shown in such patent. By reference thereto those skilled in the art will readily understand the arrangement thereof without further description. A shield 52 is positioned about the strain wires for protection thereof, said shield being connected to the frame 28 by any suitable means.

Accordingly, it will be understood that in normal operation of the device, when a force is applied to the rod 14, certain of the strain wires such as 44 will be placed under tension and certain of the strain wires such as 48 will become relaxed. This change in tension is sensed by arrangement of the strain wires in a Wheatstone bridge circuit, well understood in the art, for measuring the applied force which is proportional to the change in strain in the wires and to the resultant change in electrical resistance thereof.

The transducer 10 also includes a pair of oppositely arranged counterbalancing structures 54 and 54'. Each of these counterbalancing structures is arranged symmetrically on opposite sides of the longitudinal axis of the armature 18 and since both of these structures are exactly alike, a description of one of such structures 54 will suffice to describe also the structure of the other counterbalancing structure 54', the components of which are supplied with prime numbers corresponding to the same parts of the counterbalancing structure 54.

Referring particularly to Figs. 2, 3, 4, and 7, there is mounted centrally on the armature near one end thereof a center post 56 which is formed with a hemispherical longitudinal groove 58, and having a base plate 60 which is connected to the armature by means of screw 62. The counterbalancing structures 54 and 54' are connected to the center post 56, as specifically described below with reference to counterbalancing structure 54.

The counterbalancing structure 54 comprises a flat spring 64 which is connected at one end to an end face 63 of the post 56, the opposite end of spring 64 being connected on its opposite surface to the end face 66 of the enlarged end portion 67 of a lever arm 68. End portion 67 of such arm is wider than the remaining portion of the lever arm 68, and carries an upstanding ear 80. Mounted on the armature 18 and spaced from lever arm 68 and the center post 56, is a block 70 connected to the armature by a screw 71. The block 70 is connected to the lever arm 67 by a cruciform flexure 72. Such flexure comprises a pair of flat springs 74 which are spaced apart from each other and parallel, adjacent ends of springs 74 being connected to a side face 75 of the post 70, the opposite ends of springs 74 being connected on their opposite surfaces to the outwardly extending end faces 76 of end portion 67 of the lever arm 68. Another flat spring 78 is connected to the front face 79 of the block 70 and extends between springs 74 and perpendicular thereto, the other end of spring 78 being connected to the ear 80 of the lever arm 68.

Referring now particularly to Figs. 1, 2, 4, 5, and 6, mounted just beyond an outer longitudinal edge of the frame 28 and positioned parallel to the longitudinal axis of the armature 18 is a bar weight 82. At one end of the weight 82 are mounted pins 84 which are connected to a spring 86 fastened by suitable means to the bracket 12. The opposite end of the bar weight 82 carries a center pin 88 which is received in a groove 90 at the end of the lever arm 68 and is fastened in such groove, e.g., by soldering. The bar weight 82 has a central longitudinally extending recess 92 which is adapted to receive a trim weight 94 which is fastened in the recess 92 by means of the screw 96. The recess 92 permits the insection of trim weights of various lengths for proper adjustment of the total mass of the counterbalancing bar weight, as desired.

It will be seen that if the instrument is set on end or a linear acceleration is applied along the longitudinal axis of the armature so that, for example, the armature is displaced to the right as viewed in Fig. 2, the bar weights 82 and 82' which are exactly alike will be displaced to the right also, simultaneously with displacement of the armature. Such displacement of the bar weight 82 will produce a moment of force against the lever arm 68, causing such arm to pivot at the intersection of springs 74 and spring 78 of the cruciform flexure 72. This moment of force will tend to cause counterclockwise rotation of the lever arm 68, and through its connection with the armature 18 by the spring 64, such tendency toward counterclockwise rotation of arm 68 opposes the motion of the armature 18 to the right. Likewise, the motion of the bar weight 82' to the right simultaneously with the armature 18, viewing Fig. 2, will produce a moment of force on the lever arm 68' causing it to pivot at the intersection of the springs 74' and the spring 78' of the cruciform flexure 72' in a clockwise direction. Such clockwise rotational tendency of the lever arm 68' will be applied to the armature 18 via the connection of lever arm 68' to spring 64', and will also oppose the motion of armature 18 to the right.

When the instrument is set on its opposite end or an acceleration applied to the instrument along the axis of the armature such that the armature is displaced to the left as viewed in Fig. 2, the bar weights 82 and 82' will be displaced simultaneously in the same direction. As result of the lever system, including arm 68, the cruciform flexure 72 and the spring connection 64, the moment of force applied by displacement of the bar weight 82 will produce a clockwise rotation of the lever arm 68 opposing the displacement of the armature 18 to the left. Likewise, the displacement of bar weight 82' to the left will produce, through the lever system 68', cruciform flexure 72' and the spring connection 64', counterclockwise rotation of arm 68', also opposing the displacement of armature 18 to the left.

From the foregoing description of the counter-balancing structures 54 and 54', it will be seen that movement of the bar weights 82 and 82' the same amount in the same direction as the armature 18, produces equal but opposite rotational moments of the lever arms 68 and 68', and these moments are translated into symmetrically equal and parallel components of force applied in the same direction but in opposition to the direction of motion of the armature 18, to oppose and substantially cancel out the movement of the armature in the same direction as the motion of the bar weights 82 and 82'. By proper selection of the magnitude of the trim weights 94 and 94' to be applied to the bar weights 82 and 82', depending on the particular conditions of operation, the tendency toward motion of the armature as result of upending of the instrument or linear acceleration thereof along the axis of the armature can be eliminated according to the invention, so that no spurious output from the instrument is obtained.

It will be understood that the instrument comprising the counterbalancing structures of the invention will require a greater force applied to rod 14 for displacement of the armature a given amount than would be required in the absence of such counterbalancing structures. This is due of course to the restraining forces applied against motion of the armature in either direction by the above described lever systems and attached bar weights.

In place of an unbonded strain wire sensing means it will be recognized that any equivalent motion sensing means such as an inductive type motion sensing means can be employed to sense the motion of the armature on application of an applied force to be measured.

While I have shown the use of bar weights 82 and 82' I can instead use other mass configurations, such as circular or elliptically shaped weights, providing they are symmetrically positioned on opposite sides of the armature and have substantially the same mass.

From the foregoing it is seen that I have designed a transducer which is not affected by any tendency toward motion of the armature as result of upending of the instrument or linear acceleration of the instrument, and hence does not produce spurious response under these conditions. On the other hand the counterbalancing structure of the invention provided for this purpose does not adversely affect the operation of the instrument under normal operating conditions.

While I have described a particular embodiment of my invention for the purpose of illustration, it should be understood that various modifications and adaptations thereof may be made within the spirit of the invention as set forth in the appended claims.

I claim:

1. A motion sensing device which comprises a frame, an armature mounted on said frame, said armature being movable with respect to said frame, a motion sensing means connected to said armature, a first counterbalancing mass positioned on one side of said armature, said first mass being yieldably connected to said frame, a second counterbalancing mass positioned on the other side of said armature, said second mass being yieldably connected to said frame, said first and second masses being substantially equal, a first resiliently mounted lever system connected between said first mass and said armature, and a second like resiliently mounted lever system connected between said second mass and said armature, said first mass and said first lever system being arranged symmetrically on the opposite side of the longitudinal axis of said armature, with respect to said second mass and said second lever system, said masses each being mounted for movement in a direction to oppose the motion of said armature.

2. A motion sensing device which comprises a frame, an armature mounted on said frame, said armature being movable with respect to said frame, a motion sensing means connected to said armature, a first counterbalancing mass positioned on one side of said armature, said first mass being yieldably connected to said frame, a second counterbalancing mass positioned on the other side of said armature, said second mass being yieldably connected to said frame, said first and second masses being substantially equal, a first resiliently hinged lever arm connected at one end to said armature and extending laterally thereof, said first arm being connected at its other end to said first mass, a second resiliently hinged lever arm connected at one end to said armature and extending laterally thereof, said second arm being connected at its other end to said second mass, said first and second lever arms having substantially the same length and being hinged at like positions intermediate their ends, said masses each being mounted for movement in a direction to oppose the motion of said armature.

3. A motion sensing device which comprises a frame, an armature mounted on said frame, said armature being movable with respect to said frame, a motion sensing means connected to said armature, a first counterbalancing mass positioned on one side of said armature, said first mass being yieldably connected to said frame, a second counterbalancing mass positioned on the other side of said armature, said second mass being yieldably connected to said frame, said first and second masses being equal, a first lever arm, a first cruciform flexure on said frame, said first lever arm being mounted intermediate its ends on said cruciform flexure, said first lever arm extending laterally of said armature and connected at one end to said armature and at its other end to said first mass, a second lever arm, a second cruciform flexure on said frame, said second lever arm being mounted intermediate its axis on said second cruciform flexure, said second lever arm extending laterally of said armature and connected at one end to said armature and at its other end to said second mass, said first and second lever arms having substantially the same length, and being mounted on said cruciform flexures at like positions intermediate their ends.

4. A motion sensing device which comprises a frame, an armature mounted on said frame, said armature being movable with respect to said frame, a motion sensing means connected to said armature, a first counterbalancing mass positioned on one side of said armature, said first mass being yieldably connected to said frame, a second counterbalancing mass positioned on the other side of said armature, said second mass being yieldably connected to said frame, said first and second masses being substantially equal, a first lever arm connected at one end to said armature and extending laterally thereof, said first arm being connected at its other end to said first mass, said first arm intermediate its ends being pivoted on a first yieldable hinge, a second lever arm connected at one end to said armature and extending laterally thereof, said second arm being connected at its other end to said second mass, said second arm intermediate its ends being pivoted on a second yieldable hinge, said first and second lever arms having substantially the same length, and the distance between the point of connection of said first arm with said first mass, and said first hinge being substantially the same as the distance between the point of connection of said second arm with said second mass, and said second hinge, whereby equal and opposite moments of force are applied by said masses to said armature on axial motion thereof.

5. A motion sensing device which comprises a frame, an armature mounted on said frame, said armature being movable with respect to said frame, a motion sensing means connected to said armature, a first counterbalancing mass positioned on one side of said armature, said first mass being yieldably connected to said frame, a second counterbalancing mass positioned on the other side of said armature, said second mass being yieldably connected to said frame, said first and second masses being substantially equal, a first lever arm connected at one end to said armature and extending substantially perpendicular to the longitudinal axis thereof, said first arm being connected at its other end to said first mass, said first arm intermediate its ends being pivoted on a first cruciform flexure, a second lever arm connected at one end to said armature and extending substantially perpendicular to the longitudinal axis thereof, said second arm being connected at its other end to said second mass, said second arm intermediate its ends being pivoted on a second cruciform flexure, said first and second lever arms having substantially the same length, and the distance between the point of connection of said first arm with said first mass, and said first flexure being substantially the same as the distance between the point of connection of said second arm with said second mass, and said second flexure, whereby equal and opposite moments of force are applied by said masses to said armature on axial motion thereof.

6. A motion sensing device which comprises a frame, an armature mounted on said frame, said armature being movable with respect to said frame, a wire connection on said frame, a wire connection on said armature, an electrical resistance strain wire mounted in tension on said wire connections, a first counterbalancing mass positioned on one side of said armature, said first mass being yieldably connected to said frame, a second counterbalancing mass positioned on the other side of said armature, said second mass being yieldably connected to said frame, said first and second masses being substantially equal, a first lever arm connected at one end to said armature and extending substantially perpendicular to the longitudinal axis thereof, said first arm being connected at its other end to said first mass, said first arm intermediate its ends being pivoted on a first cruciform flexure, a second lever arm connected at one end to said armature and extending substantially perpendicular to the longitudinal axis thereof, said second arm being connected at its other end to said second mass, said second arm intermediate its ends being pivoted on a second cruciform flexure, said first and second lever arms having substantially the same length, and the distance between the point of connection of said first arm with said first mass, and said first flexure being substantially the same as the distance between the point of connection of said second arm with said second mass, and said second flexure, whereby equal and opposite moments of force are applied by said masses to said armature on axial motion thereof.

7. A motion sensing device which comprises a frame, an armature mounted on said frame, said armature being movable with respect to said frame, a motion sensing means connected to said armature, a first counterbalancing mass positioned on one side of said armature, said first mass being yieldably connected at one end to said frame, a second counterbalancing mass positioned on the other side of said armature, said second mass being yieldably connected at one end to said frame, said first and second masses being substantially equal, a first lever arm resiliently connected at one end to said armature and extending laterally thereof, said first arm being connected at its other end to the other end of said first mass, a first cruciform flexure, said first arm being connected intermediate its ends to said first cruciform flexure, a second lever arm resiliently connected at one end to said armature and extending laterally thereof, said second arm being connected at its other end to the other end of said second mass, a second cruciform flexure, said second arm being connected intermediate its ends to said second cruciform flexure, said first and second lever arms having substantially the same length, and the distance between said respective first and second cruciform flexures and the connections of said respective arms with said armature being substantially equal, and the distance between said respective first and second cruciform flexures and the connections of said respective arms with said masses being substantially equal, whereby equal and opposite moments of force are applied by said masses to said armature to restrain axial motion thereof.

8. A motion sensing device which comprises a frame, an armature mounted on said frame, said armature being movable with respect to said frame, a wire connection on said frame, a wire connection on said armature, an electrical resistance strain wire mounted in tension on said wire connections, a first counterbalancing mass positioned on one side of said armature, said first mass being yieldably connected at one end to said frame, a second counterbalancing mass positioned on the other side of said armature, said second mass being yieldably connected at one end to said frame, said first and second masses being substantially equal, a first lever arm resiliently connected at one end to said armature and extending laterally thereof, said first arm being connected at its other end to the other end of said first mass, a first cruciform flexure, said first arm being connected intermediate its ends to said first cruciform flexure, a second lever arm resiliently connected at one end to said armature and extending laterally thereof, said second arm being connected at its other end to the other end of said second mass, a second cruciform flexure, said second arm being connected intermediate its ends to said second cruciform flexure, said first and second lever arms having substantially the same length, and the distance between said respective first and second cruciform flexures and the connections of said respective arms with said armature being substantially equal, and the distance between said respective first and second cruciform flexures and the connections of said respective arms with said masses being substantially equal, whereby equal and opposite moments of force are applied by said masses to said armature to restrain axial motion thereof.

9. A motion sensing device as defined in claim 7, including means for adjusting the weight of each of said masses.

10. A motion sensing device which comprises a frame, an armature mounted on said frame, said armature being movable with respect to said frame, a motion sensing means connected to said armature, a first counterbalancing mass positioned on one side of said armature, said first mass being mounted for movement with respect to said frame, a second counterbalancing mass positioned on the other side of said armature, said second mass being mounted for movement with respect to said frame, said first and second masses being substantially equal, a first lever system connected between said first mass and said armature, said first mass being mounted for pivotal movement on said first lever system, a second like lever system connected between said second mass and said armature, said second mass being mounted for pivotal movement on said second lever system, said first mass and said first lever system being arranged symmetrically on the opposite side of the longitudinal axis of said armature, with respect to said second mass and said second lever system, said mass each being mounted for movement in a direction to oppose the motion of said armature.

References Cited in the file of this patent

UNITED STATES PATENTS

| | | |
|---|---|---|
| 2,203,061 | Schmettow | June 4, 1940 |
| 2,573,285 | Statham | Oct. 30, 1951 |
| 2,760,037 | Statham | Aug. 21, 1956 |